United States Patent
Yanagisawa

(10) Patent No.: US 11,810,295 B2
(45) Date of Patent: Nov. 7, 2023

(54) DYNAMIC IMAGE ANALYSIS APPARATUS, DYNAMIC IMAGE ANALYSIS METHOD, AND STORAGE MEDIUM

(71) Applicant: KONICA MINOLTA, INC., Tokyo (JP)

(72) Inventor: Kenichi Yanagisawa, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 253 days.

(21) Appl. No.: 17/232,327

(22) Filed: Apr. 16, 2021

(65) Prior Publication Data
US 2021/0358118 A1    Nov. 18, 2021

(30) Foreign Application Priority Data
May 15, 2020 (JP) .................. 2020-085930

(51) Int. Cl.
*G06K 9/00* (2022.01)
*G06T 7/00* (2017.01)
*G06T 7/246* (2017.01)

(52) U.S. Cl.
CPC ............ *G06T 7/0012* (2013.01); *G06T 7/246* (2017.01); *G06T 2207/10016* (2013.01); *G06T 2207/10116* (2013.01); *G06T 2207/30061* (2013.01)

(58) Field of Classification Search
CPC ....... A61B 6/5217; A61B 35/12; A61B 6/463; G06K 9/00; G06T 7/00

(Continued)

(56) References Cited

U.S. PATENT DOCUMENTS 8,521,561 B2 * 8/2013 Sasai ..................... G16H 15/00
705/2
10,540,767 B2    1/2020 Matsutani
(Continued)

FOREIGN PATENT DOCUMENTS

| JP | 5520078 B2 | 4/2014 |
| JP | 2018148964 A | 9/2018 |
| JP | 2019030608 A | 2/2019 |

OTHER PUBLICATIONS

Japanese Office Action (and an English language translation thereof) dated Aug. 22, 2023, issued in counterpart Japanese Application No. 2020-085930.

*Primary Examiner* — Seyed H Azarian
(74) *Attorney, Agent, or Firm* — Holtz, Holtz & Volek PC

(57) ABSTRACT

A dynamic image analysis apparatus includes a hardware processor and a display. The hardware processor performs tagging for classifying. The hardware processor extracts a feature amount from frame images and calculates a change amount in a time direction of the feature amount. When a second dynamic image is input, the hardware processor selects an extractable feature amount from a related dynamic image which is the first dynamic image determined to be related with the second dynamic image, the first dynamic image and the second dynamic image. The display is capable of displaying a change over time in the frame images included in one occasion of imaging of the dynamic image, the change over time between the second dynamic image and the selected related dynamic image and the change over time between the feature amount extracted from the second dynamic image and the feature amount extracted from the related image.

15 Claims, 9 Drawing Sheets

(58) Field of Classification Search
USPC ........ 382/100, 103, 106–107, 128–132, 168, 382/173, 181, 189–190, 219, 224, 254, 382/274–276, 286, 305, 312; 707/17.026; 705/2; 348/333.05
See application file for complete search history.

(56) References Cited

U.S. PATENT DOCUMENTS

| | | |
|---|---|---|
| 10,810,741 B2 | 10/2020 | Matsutani |
| 11,410,312 B2 | 8/2022 | Matsutani |
| 2008/0052126 A1* | 2/2008 | Sasai ................. G16H 30/20 707/E17.026 |
| 2015/0077430 A1* | 3/2015 | Conroy ............... G06T 11/60 345/589 |
| 2016/0120491 A1* | 5/2016 | Shimamura ........... A61B 6/463 348/333.05 |
| 2018/0330501 A1* | 11/2018 | Muraoka .............. A61B 6/5217 |
| 2020/0167918 A1 | 5/2020 | Ando et al. |
| 2021/0052228 A1* | 2/2021 | Abe ................... A61B 5/7275 |

* cited by examiner

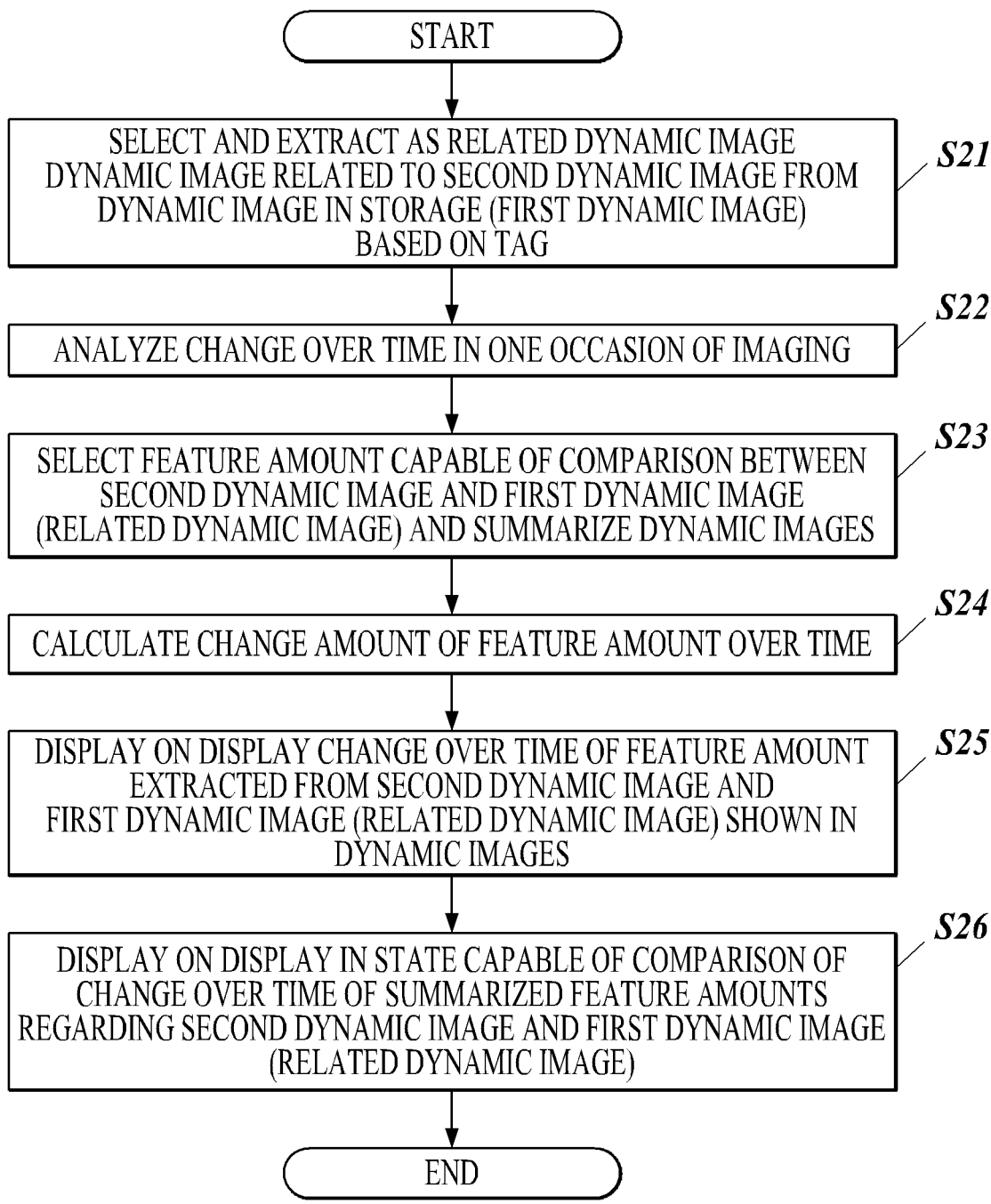

FIG.8

| DIAPHRAGM DISPLACEMENT | | | |
|---|---|---|---|
| # | TYPE | ITEM | MEASURED VALUE |
| 121 | MAXIMUM MOVEMENT AMOUNT | RIGHT | 32mm |
| 114 | MAXIMUM MOVEMENT AMOUNT | LEFT | 49mm |

FIG.9

| LUNG FIELD AREA | | | |
|---|---|---|---|
| # | TYPE | ITEM | MEASURED VALUE |
| 226 | MAXIMUM AREA | RIGHT | 24126m ⋯ |
| 226 | MAXIMUM AREA | LEFT | 22115m ⋯ |
| 226 | MAXIMUM AREA | TOTAL | 46241m ⋯ |
| 124 | MINIMUM AREA | RIGHT | 19921m ⋯ |
| 124 | MINIMUM AREA | LEFT | 17414m ⋯ |
| 124 | MINIMUM AREA | TOTAL | 37335m ⋯ |
| ⋯ | AREA CHANGE RATE | RIGHT | 17% |
| ⋯ | AREA CHANGE RATE | LEFT | 21% |
| ⋯ | AREA CHANGE RATE | TOTAL | 19% |

DYNAMIC IMAGE ANALYSIS APPARATUS, DYNAMIC IMAGE ANALYSIS METHOD, AND STORAGE MEDIUM

CROSS-REFERENCE TO RELATED APPLICATIONS

The entire disclosure of Japanese Patent Application No 2020-085930 filed on May 15, 2020 is incorporated herein by reference in its entirety.

BACKGROUND

Technological Field

The present invention relates to a dynamic image analysis apparatus, a dynamic image analysis method, and a storage medium.

Description of the Related Art

Lately, it is possible to perform imaging within a very short time successively in order to obtain an image (dynamic image) which captures a movement of a target site (site which is to be a target of examination and diagnosis) in a live body.

For example, image analysis is performed on the dynamic image imaging the chest portion and it is possible to obtain information to be able to understand the change over time in one imaging of a diaphragm or a lung field margin.

However, in order to perform diagnosis of diseases accurately and effectively, it is important to understand the change in the state of the target site over time shown in a plurality of occasions of imaging over a certain period of time, for example, comparison between before operation and after operation or follow-up observation from the start of treatment.

For example, JP 5520078 discloses a technique in which information showing bone density distribution is stored together with the date of measurement. The bone density distributions in the same site for the same patient on a different date of measurement are compared and the amount of change in the bone density is obtained.

SUMMARY

However, in the typical radiation imaging as described in JP 5520078, the change over time in the state of the target site can be understood among images obtained by imaging instantaneously at different points of time. However, it is difficult to capture the change over time within one occasion of imaging.

As the diagnosis progresses, the contents of diagnosis change. Therefore, in order to provide information useful for diagnosis to the doctor, there is a demand to capture the change over time from various viewpoints necessary according to the change in the contents of diagnosis. However, the purpose of use and the purpose of examination in images of existing typical radiation imaging is already established, and the information provided for diagnosis is fixed to a certain degree. Therefore, it is difficult to flexibly use the images for other purposes and to utilize the images.

The purpose of the present disclosure is to provide a dynamic image analysis apparatus, a dynamic image analysis method and a storage medium which are capable of providing information of change over time captured from various viewpoints regarding a state in a target site.

To achieve at least one of the abovementioned objects, according to an aspect of the present invention, a dynamic image analysis apparatus reflecting one aspect of the present invention includes a hardware processor; and a display, wherein, the hardware processor performs tagging regarding an item that helps classifying of a dynamic image which is obtained by radiation imaging of a subject including a target site in a live body and in which data for one occasion of imaging includes a plurality of frame images, the hardware processor extracts a feature amount from one or more frame images included in the dynamic image and calculates a change amount in a time direction of the feature amount, when a second dynamic image obtained by a different occasion of imaging and including a same target site as a first dynamic image is input, the hardware processor selects an extractable feature amount from a related dynamic image which is the first dynamic image determined to be related with the second dynamic image from the set tag, the first dynamic image and the second dynamic image, the display is capable of displaying a change over time in the frame images included in one occasion of imaging of the dynamic image, the display is capable of displaying the change over time between the second dynamic image and the selected related dynamic image and the display is capable of displaying the change over time between the feature amount extracted from the second dynamic image and the feature amount extracted from the related image, and the hardware processor controls a display shown on the display.

According to another aspect, a dynamic image analysis method includes, tagging regarding an item that helps classifying of a dynamic image which is obtained by radiation imaging of a subject including a target site in a live body and in which data for one occasion of imaging includes a plurality of frame images, extracting a feature amount from one or more frame images included in the dynamic image and calculating a change amount in a time direction of the feature amount, when a second dynamic image obtained by a different occasion of imaging and including a same target site as a first dynamic image is input, selecting an extractable feature amount from a related dynamic image which is the first dynamic image determined to be related with the second dynamic image from the set tag, the first dynamic image and the second dynamic image, and displaying on a display a change over time in the frame images included in one occasion of imaging of the dynamic image, displaying on the display the change over time between the second dynamic image and the selected related dynamic image and displaying on the display the change over time between the feature amount extracted from the second dynamic image and the feature amount extracted from the related image.

According to another aspect, a non-transitory computer-readable storage medium storing a program causing a computer to perform: tagging regarding an item that helps classifying of a dynamic image which is obtained by radiation imaging of a subject including a target site in a live body and in which data for one occasion of imaging includes a plurality of frame images, extracting a feature amount from one or more frame images included in the dynamic image and calculating a change amount in a time direction of the feature amount, when a second dynamic image obtained by a different occasion of imaging and including a same target site as a first dynamic image is input, selecting an extractable feature amount from a related dynamic image which is the first dynamic image determined to be related with the second dynamic image from the set tag, the first dynamic image and the second dynamic image, and displaying on a display a change over time in the frame images included in one occasion of imaging of the dynamic image, displaying on the display the change over time between the second dynamic image and the selected related dynamic image and displaying on the display the change over time between the feature amount extracted from the second dynamic image and the feature amount extracted from the related image.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 4 is a flowchart showing a procedure of a display process showing change over time in the dynamic image analysis method according to one embodiment;

FIG. 8 is a table showing an example of a maximum displacement amount of a diaphragm;

FIG. 9 is a table showing an example of a displacement of a lung field area;

DETAILED DESCRIPTION OF EMBODIMENTS

Embodiments of a dynamic image analysis apparatus, a dynamic image analysis method, and a storage are described with reference to FIG. 1 to FIG. 11.

Various preferable technical limits are applied to the embodiments to implement the invention, but the technical scope of the present invention is not limited to the embodiments described below and the illustrated examples.

The dynamic image analysis apparatus according to the present embodiment is provided in a medical image system and performs analysis of a dynamic image D (see FIG. 5) among images (medical images) obtained by various modalities.

Figure 1:
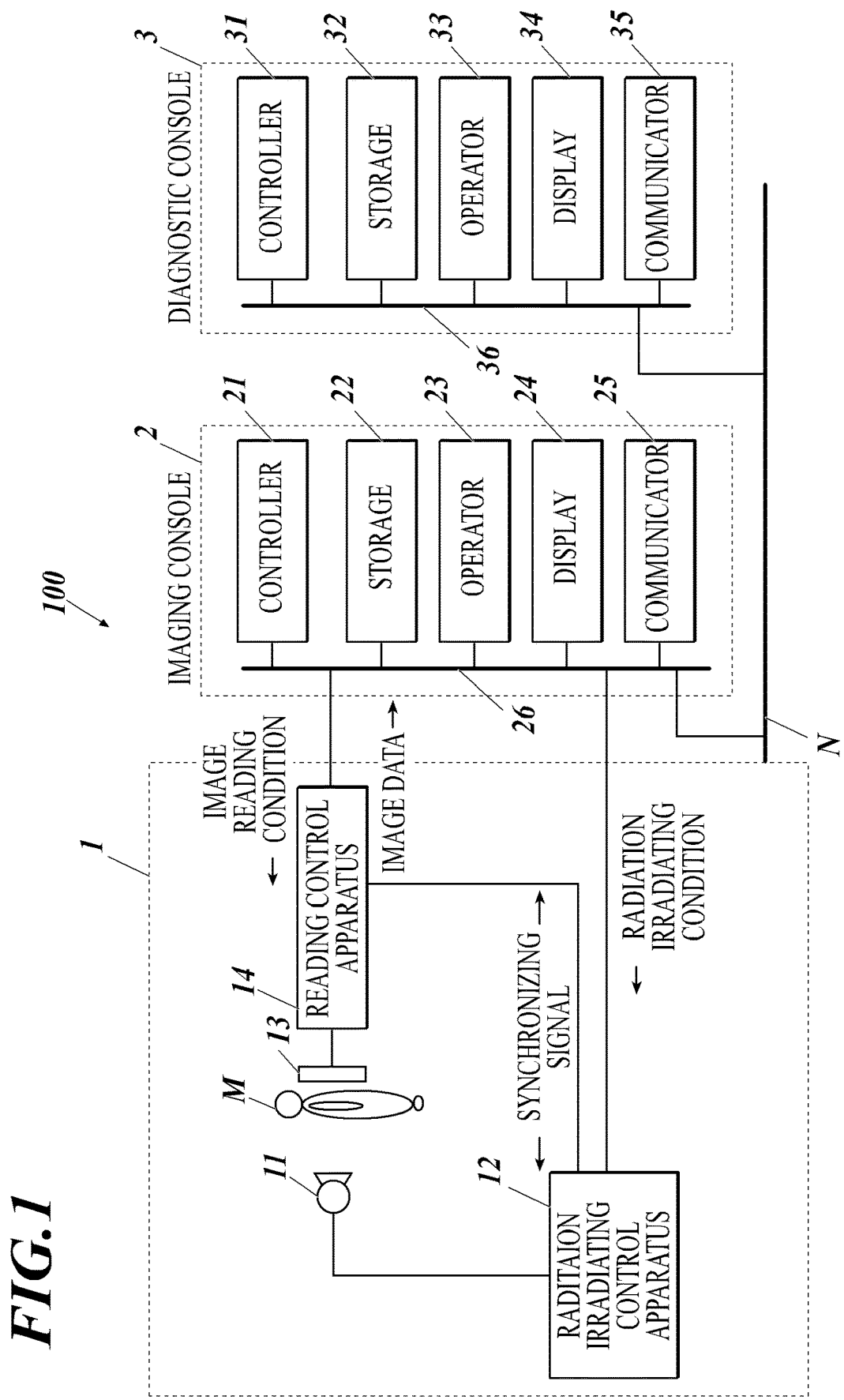
FIG. 1 is a diagram showing a configuration of main sections for describing a system configuration of a medical image system including a dynamic image analysis apparatus according to one embodiment.

FIG. 1 is a diagram showing an entire configuration of a medical image system 100 according to the present embodiment.

As shown in FIG. 1, in the medical image system 100, an imaging apparatus 1 is connected with an imaging console 2 by a communication cable, etc. and the imaging console 2 is connected with a diagnostic console 3 through a communication network NT such as a LAN (Local Area Network), etc. The apparatuses included in a medical image system 100 conform with the DICOM (Digital Image and Communications in Medicine) standard, and the communication among apparatuses is performed according to DICOM.

As described later, according to the present embodiment, the diagnostic console 3 functions as the dynamic image analysis apparatus.

[Configuration of Imaging Apparatus 1]

For example, the imaging apparatus 1 is an imager which images a dynamic state of a live body such as change in the shape of the lungs such as expansion and contraction due to breathing and beating of the heart.

As shown in FIG. 1, the imaging apparatus 1 includes a radiation source 11, a radiation irradiating control apparatus 12, a radiation detector 13, and a reading control apparatus 14.

Here, dynamic imaging is to obtain an image by imaging a subject including a target site in a live body (for example, near the lung field or the heart of a chest portion) by radiation. Pulsed radiation such as an X-ray, etc. is repeatedly irradiated on a subject at a predetermined time interval (pulsed irradiation) or a low dose of radiation is continuously irradiated without being cut (continuous irradiation). With this, a plurality of images are obtained. A series of images obtained by dynamic imaging is called a dynamic image D. In the dynamic image D, data of one occasion of imaging includes a plurality of images, and the image included in the dynamic image D is called a frame image (frame images d1 to dn in FIG. 5).

In the embodiments described below, an example when the dynamic imaging is performed by pulsed irradiation is described. According to the embodiments described below, the target site which is to be the target of diagnosis is to be around the lung field in the chest portion (lung field and diaphragm), but the target site is not limited to the above. Other examples of the target site may be, in the chest portion, the heart, pulmonary vessels, intercostal muscle, or rib cage, in the stomach portion, intestines, esophagus, or in other portions, knees, elbows, neck or the spine. Various orthopedic sites and various tissues can be the target site.

The radiation source 11 is positioned facing the radiation detector 13 with the subject M in between. According to the control by the radiation irradiating control apparatus 12, the radiation (X-ray) is irradiated to the subject M.

The radiation irradiating control apparatus 12 is connected to the imaging console 2. Based on the radiation irradiating condition input from the imaging console 2, the radiation irradiating control apparatus 12 controls the radiation source 11 and performs the radiation imaging. The radiation irradiating conditions input from the imaging console 2 includes, for example, pulse rate, pulse width, pulse interval, imaging frame number for each occasion of imaging, value of X-ray tube current, value of X-ray tube voltage, additional filter type, and the like. The pulse rate is the number of times the radiation is irradiated every second, and matches with the later described frame rate. The pulse width is the amount of time radiation is irradiated each time radiation is irradiated. The pulse interval is the amount of time from the start of one irradiation of radiation to the start of the next irradiation of radiation, and matches with the later-described frame interval.

The radiation detector 13 includes a semiconductor image sensor such as a FPD, etc. For example, the FPD includes the glass substrate, and a plurality of detection elements (pixel) are arranged in a matrix in a predetermined position on the substrate. The detection elements detect the radiation which is irradiated from the radiation source 11 and which passes at least the subject M according to the strength, convert the detected radiation to electric signals, and accumulate the above. The pixels include a switching unit such as a TFT (Thin Film Transistor). Examples of FPDs include an indirect conversion type which converts the X-ray to electric signals by photoelectric conversion elements through a scintillator and a direct conversion type which directly converts the X-ray to electric signals. Either type can be used in the embodiments. According to the present embodiment, the pixel value (density value) of the image data generated in the radiation detector 13 becomes higher as the amount of radiation which is transmitted becomes larger.

The radiation detector 13 is provided facing the radiation source 11 with the subject M in between.

The reading control apparatus 14 is connected to the imaging console 2. The reading control apparatus 14 controls the switching unit of each pixel of the radiation detector 13 based on the image reading condition input from the imaging console 2 and the reading of the electric signals accumulated in each pixel is switched. The electric signals accumulated in the radiation detector 13 is read and with this, the image data is obtained. This image data is the frame images d1 to dn. Then, the reading control apparatus 14 outputs the obtained frame image to the imaging console 2. For example, the image reading conditions include, the frame rate, the frame interval, the pixel size, the image size (matrix size), etc. The frame rate is the number of frame images obtained every second, and matches the pulse rate. The frame interval is the amount of time from the start of an operation of obtaining one frame image to the start of obtaining the next frame image and matches with the pulse interval.

Here, the radiation irradiating control apparatus 12 and the reading control apparatus 14 are connected to each other, and communicate synchronizing signals to each other to synchronize the operation of reading the image with the radiation irradiating operation.

[Configuration of Imaging Console 2]

The imaging console 2 outputs the radiation irradiating condition and the image reading condition to the imaging apparatus 1 and controls the radiation imaging and the reading of the radiation image by the imaging apparatus 1. Moreover, the imaging console 2 displays the dynamic image obtained by the imaging apparatus 1 so that the person performing the imaging such as the imaging technician is able to confirm the positioning or is able to confirm whether the image is suitable for diagnosis.

As shown in FIG. 1, the imaging console 2 includes a controller 21, a storage 22, an operator 23, a display 24, and a communicator 25. Each unit is connected to each other by a bus 26.

The controller 21 includes a CPU (Central Processing Unit) and a RAM (Rando Access Memory). In response to the operation on the operator 23, the CPU of the controller 21 reads the system program and various processing programs stored in the storage 22 and deploys the programs in the RAM. The CPU of the controller 21 executes various processes such as the later described imaging control process according to the deployed program, and centrally controls the operation of each unit in the imaging console 2 and the radiation irradiating operation and the reading operation of the imaging apparatus 1.

The storage 22 includes a nonvolatile semiconductor memory, a hard disk, and the like. The storage 22 stores various programs stored by the controller 21, the parameters necessary to execute the process by the programs or the data such as the processing result. For example, the storage 22 stores the program to execute the imaging control process shown in FIG. 2. The storage 22 stores the radiation irradiating condition and the image reading condition corresponded with the imaging site. The various programs are stored in a form of a readable program code, and the controller 21 sequentially executes the operation according to the program code.

The operator 23 includes a keyboard including a cursor key, a numeric input key, and various function keys, and a pointing device such as a mouse. The operator 23 outputs the instruction signal input by the key operation on the keyboard and the mouse operation to the controller 21. The operator 23 may include a touch panel on the display screen of the display 24, and in this case, the instruction signal input through the touch panel is output to the controller 21.

The display 24 includes a monitor such as an LCD (Liquid Crystal Display), a CRT (Cathode Ray Tube) or the like, and displays instructions input from the operator 23 and data according to the instructions of the display signals input from the controller 21.

The communicator 25 includes a LAN adaptor, a modem, a TA (Terminal Adapter), and the like, and the communicator 25 controls the transmitting and receiving of data with the apparatuses connected to the communication network NT.

[Configuration of Diagnostic Console 3]

The diagnostic console 3 obtains the dynamic image D from the imaging console 2, analyzes the obtained dynamic image D, generates the images and various data as the analysis result, and displays the generated analysis result. That is, the diagnostic console 3 is a dynamic image analysis apparatus which provides information to support diagnosis by a doctor.

As shown in FIG. 1, the diagnostic console 3 includes a controller 31, a storage 32, an operator 33, a display 34, and a communicator 35. Each unit is connected to each other by a bus 36.

The controller 31 includes the CPU, RAM, and the like. In response to the operation on the operator 33, the CPU of the controller 31 reads the system program and various processing programs stored in the storage 32 and deploys the program in the RAM. According to the deployed program, the CPU of the controller 31 performs the various processes such as the later-described image analysis process, and centrally controls the operation of each unit in the diagnostic console 3.

As described later, the controller 31 according to the present embodiment functions as a tag setter which tags items to help classify the dynamic image D.

The controller 31 functions as a feature change amount calculator which extracts a feature amount from one or more frame image included in the dynamic image D and calculates the change amount in a time direction of the feature amount.

When a new dynamic image D (referred to as "second dynamic image") obtained by a different occasion of imaging a target site the same as the dynamic image D imaged in the past (referred to as "first dynamic image") is input, the controller 31 functions as a data selector which selects a related dynamic image (that is, related past dynamic image D) which is the first dynamic image D determined to be related to the second dynamic image D from the tag set by the controller 31 functioning as the tag setter and the feature amount which can be extracted from the first dynamic image D and the second dynamic image D.

The controller 31 functions as a display controller which controls the display on the display 34.

The functions of the controller 31 are described later.

The storage 32 includes a nonvolatile semiconductor memory, a hard disk, and the like. The storage 32 stores various programs such as a program to execute the image analysis process in the controller 31, parameters necessary to execute the process by the programs or data such as the processing results. Such programs as stored in a form of a readable program code, and the controller 31 sequentially executes the operation according to the program code.

The storage 32 stores the dynamic image D obtained in the past, the feature amount obtained by analyzing the dynamic image D, and various data such as the change amount of the feature amount. The storage in which the dynamic image D and the various data obtained by analyzing the dynamic image D are stored is not limited to the storage 32 in the diagnosis console 3. For example, the above can be stored in the storage or a server provided outside the diagnostic console 3.

The operator 33 includes a keyboard provided with a cursor key, a numeric input key and various function keys, and a pointing device such as a mouse. The instruction signal input by operation of the keys on the keyboard and the operation of the mouse is output to the controller 31. The operator 33 may include a touch panel on the display screen of the display 34 and in this case, the instruction signal input through the touch panel is output to the controller 31.

The display 34 includes a monitor such as a LCD and a CRT, and various displays are performed according to the instruction of the display signal input from the controller 31.

The display 34 according to the present embodiment is capable of displaying the change over time in the frame images d1 to dn included in one occasion of imaging the dynamic image D. The display 34 is also capable of displaying change over time between the second dynamic image D and the related dynamic image selected by the controller 31 as the data selector and the change over time between the feature amount extracted from the second dynamic image D and the feature amount extracted from the related dynamic image.

The specific display on the display 34 is described in detail later.

The communicator 35 includes a LAN adaptor, a modem, a TA, and the like, and controls transmitting and receiving of data with other apparatuses connected to the communication network NT.

[Operation of Diagnostic Console as Dynamic Image Analysis Apparatus]

Next, the operation of the diagnostic console 3 as the above-described dynamic image analysis apparatus is described.

First, the imaging operation by the imaging apparatus 1 and the imaging console 2 in order to obtain the dynamic image is described.

When the imaging is performed, the operator 23 of the imaging console 2 is operated by the person who performs the imaging, and input of information such as patient information of subject (name, height, weight, age, sex, etc. of patient) of subject (subject M) and examination information is performed.

Examination information includes, for example, target site as the imaging target (for example, lung field, diaphragm, etc.), movement of target site, type and method of tissue change (whether it is expansion/reduction movement, or vertical movement), positioning in imaging (front, side, etc.) and imaging conditions in imaging (tube voltage, irradiating angle, imaging duration, etc.).

Next, the radiation irradiating condition is read from the storage 22 and set in the radiation irradiating control apparatus 12, the image reading condition is read from the storage 22 and set in the reading control apparatus 14, and the state becomes a standby state for the instruction to irradiate radiation by operation of the operator 23.

Here, the person who performs the imaging positions the subject M between the radiation source 11 and the radiation detector 13.

For example, when the expansion/reduction movement of the lung field or the vertical movement of the diaphragm is captured as the dynamic image D, the imaging is performed in a breathing state. Therefore, the subject (subject M) is instructed to breathe in a relaxed state and is urged to breathe quietly. When preparations for performing the imaging are complete, the operator 23 is operated and the radiation irradiating instructions are input.

According to the present embodiment, as described later, comparison and evaluation with past images are performed when new imaging is performed. The conditions that the change over time occur needs to be the same in such comparison and evaluation because otherwise an error in diagnosis may occur. Therefore, preferably, the target site in the examination, the conditions of positioning such as posture and direction (for example, instructing the subject (subject M) to stand in a predetermined positon when the side of the chest is imaged), and the imaging duration are matched to be a constant state. Moreover, the method of operation when breathing is imaged is performed according to a predetermined imaging protocol so that the imaging is performed by securing the same conditions in imaging.

By matching the conditions in imaging, when a new algorithm regarding the analysis of the image appears in the future, the process can be performed again using the new algorithm even if the image is imaged in the past, and the analysis data can be updated based on the new algorithm.

Figure 2:
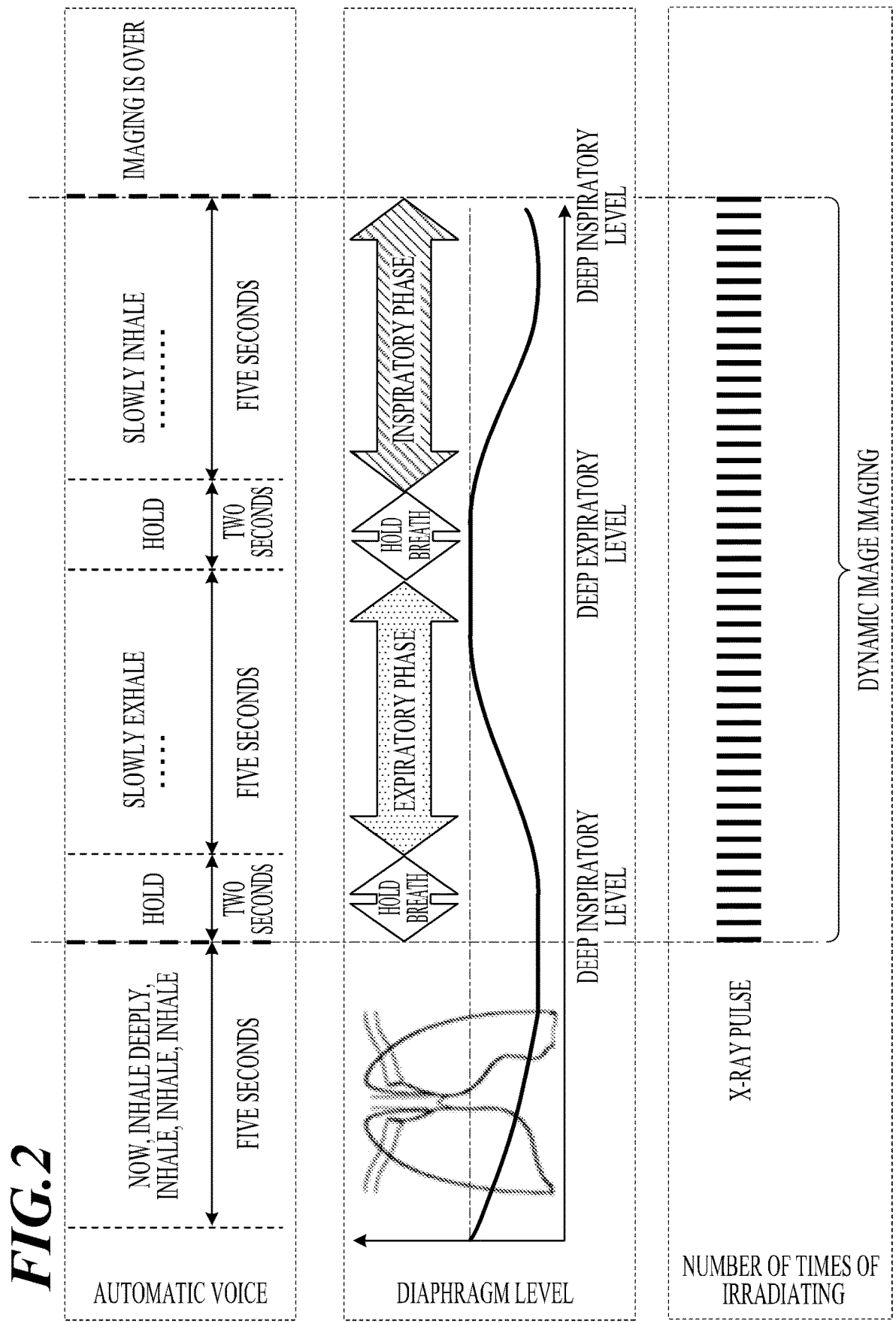
FIG. 2 is a diagram describing an example of an imaging protocol.

For example, FIG. 2 is an explanatory diagram schematically showing an example of an imaging protocol when the expansion/reduction movement of the lung field or the vertical movement of the diaphragm is captured as the dynamic image.

According to the example shown in FIG. 2, an automatic guide by sound ("automatic voice" in the drawing) guides the timing to breathe in, the timing to hold the breath, and the timing to breathe out.

The dynamic imaging is performed by irradiating the radiation such as the X-ray in a pulsed state to match the sound guiding the breathing timing.

According to the above, it is possible to image in one occasion one cycle of breathing including an "expiratory phase" in which the subject is exhaling from when the subject (subject M) holds the breath after largely inhaling, and the "inspiratory phase" in which the subject is inhaling from when the subject holds the breath after completely exhaling.

When the radiation irradiating instruction is input by the operator 23, the imaging start instruction is output to the radiation irradiating control apparatus 12 and the reading control apparatus 14, and the dynamic imaging is started. That is, the radiation is irradiated by the radiation source 11 at a pulsed interval set in the radiation irradiating control apparatus 12 and the frame images d1 to dn are obtained by the radiation detector 13.

When the imaging of a predetermined number of frames is completed, the instruction to end imaging is output from the controller 21 to the radiation irradiating control apparatus 12 and the reading control apparatus 14, and the imaging operation stops. The number of frames to be imaged is not limited, but when the change in the site by breathing is imaged as shown in FIG. 2, for example, the dynamic image D including the number of images to be able to image at least one breathing cycle is obtained.

Figure 3:
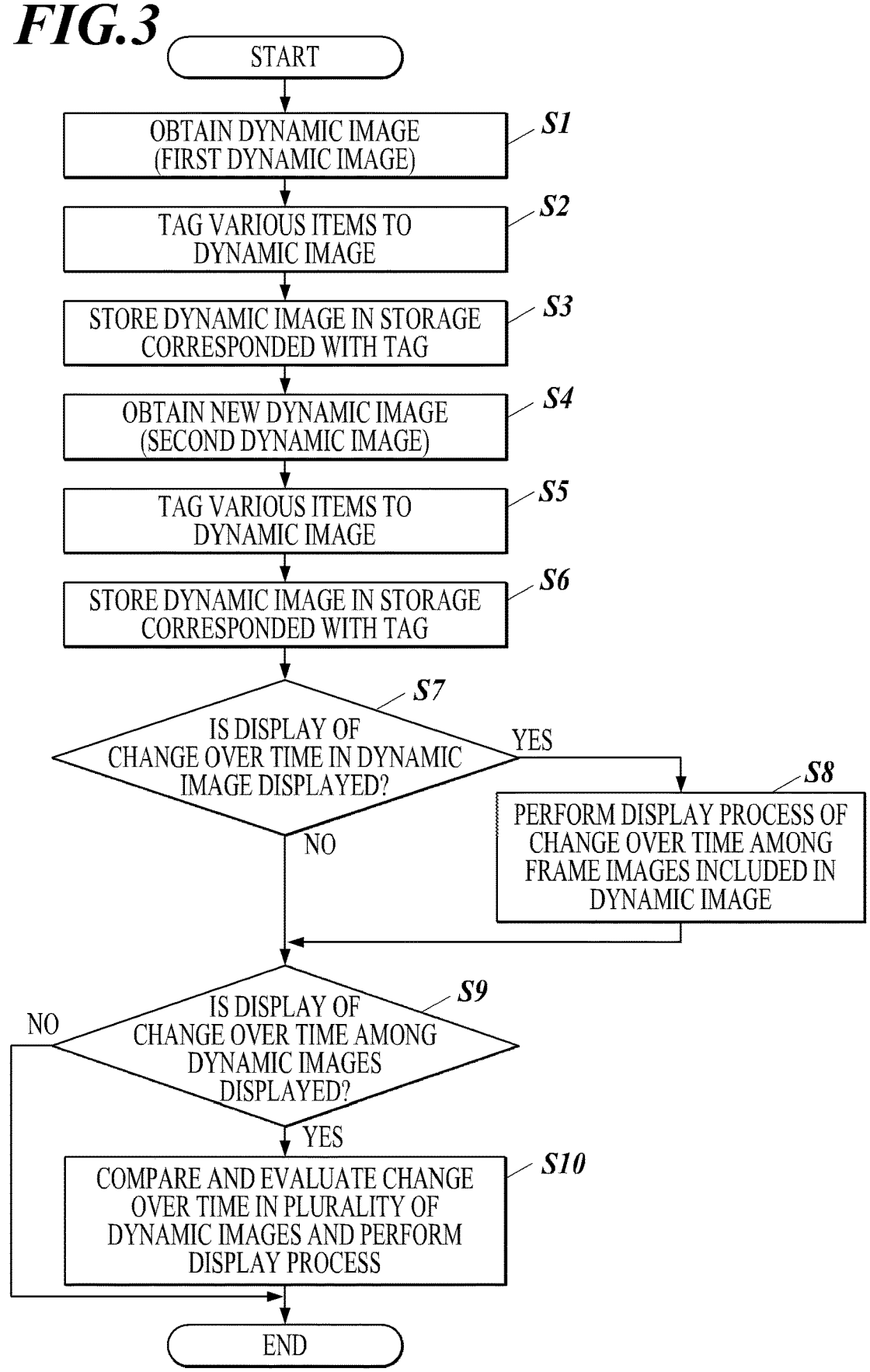
FIG. 3 is a flowchart showing a total procedure of a dynamic image analysis method according to one embodiment.

Next, the analysis method of the dynamic image D according to the present embodiment is described with reference to FIG. 3 and FIG. 4.

When the dynamic image D is imaged by the imaging apparatus 1, the frame images d1 to dn included in the dynamic image D are input sequentially in the imaging console 2, and the number showing the order of imaging (frame number) is corresponded to the frame images d1 to dn.

Then, the string of frame images d1 to dn included in the dynamic image D is received by the diagnostic console 3 from the imaging console 2 through the communicator 35. With this, the dynamic image D (first dynamic image) is obtained by the diagnostic console 3 (step S1), and a dynamic image analysis process as shown in FIG. 3 and FIG. 4 is executed by the controller 31 in coordination with the program stored in the storage 32.

Specifically, the controller 31 functions as the tag setter and tags items to the obtained dynamic image D in order to help classify the dynamic image D (step S2).

Here, "items to help classifying" means to function as an index so as to be able to search at a later date the dynamic images D which are accumulated in the storage 32.

Preferably, the tag set by the controller as the tag setter is set regarding at least one of the following items, for example, positioning in imaging (front or side, right direction or left direction), type or method of change in movement or tissue (for example, expansion/reduction of lung field due to breathing, vertical movement of diaphragm, peristaltic movement of intestines, pulsation of heart and blood vessel, bending and stretching of joints, left and right movement of site, etc.) of target site (for example, orthopedic site such as elbow or knee, chest portion, stomach portion, etc.) or actual contents of tissue in target site, and various examination conditions (for example, various imaging conditions such as imaging duration, imaging interval (frame rate), irradiating angle, radiation dose, tube position, etc., information such as model number of imaging devices, etc.).

In addition to the above, supplementary information written in the header region of the image data in a DICOM format is tagged, the supplementary information including, for example, patient information (for example, patient name, patient ID, sex, age, etc. of the patient), imaged day, imaged time, etc.

Regarding the "item to help classifying" of the dynamic image D, the controller 31 as the tag setter may tag one item or may tag a combination of a plurality of items.

For example, regarding one dynamic image D, a single tag may be attached showing that the dynamic image D is an image of a chest portion, or a tag regarding a combination of a plurality of items can be attached showing that the dynamic image D is an image of a chest portion and an image capturing the expanding and reducing of the lung field.

When the tag is set, the controller 31 stores the dynamic image D corresponded with the tag in the storage 32 (step S3).

Then, when the dynamic image D (second dynamic image) is newly obtained (step S4), similar to the dynamic image D (second dynamic image), the controller 31 as the tag setter performs tagging regarding the various "items to help classifying" (step S5) and the controller 31 stores the dynamic image D corresponded with the tag in the storage 32 (step S6).

The controller 31 determines as necessary whether to perform the display showing change over time in the dynamic image D obtained in one occasion of imaging (step S7). Such determination may be performed each time a new dynamic image D (second dynamic image) is obtained or a predetermined timing other than the above.

When the display showing change over time in one occasion of imaging is performed (step S7; YES), the change over time shown in the frame images d1 to do included in the dynamic image D is displayed on the display 34 (step S8).

When the display showing change over time in one occasion of imaging is not performed (step S7; NO) and when the display showing change over time in one occasion of imaging is performed later on, it is determined whether to perform display of the change over time in a plurality of dynamic images D imaged at different points in time (step S9).

When the display showing change over time in a plurality of dynamic images imaged at different points in time is performed (step S9; YES), the comparison and evaluation regarding the change over time among the dynamic images D is performed, and the result is displayed on the display 34 (step S10).

With reference to FIG. 4, described below is the procedure when the display showing the change over time in the dynamic image D in one occasion of imaging is performed and when the comparison and evaluation regarding the change over time in the plurality of dynamic images D imaged at different points in time and the display of the result of the above are performed.

In this case, the controller 31 functions as the data selector, and based on the information of the tag, the controller 31 selects and extracts the dynamic image determined to be related with the second dynamic image D as a related dynamic image from the dynamic image D (first dynamic image imaged in the past) in the storage 32 (step S21).

For example, the controller 31 searches the tag such as the dynamic image which images the chest portion of the subject (subject M) the same as the subject in the second dynamic image D and which images the subject positioned facing the front, and the controller 31 selects and extracts the related dynamic image from the first dynamic image D already obtained.

The tag used in the search can be input by the doctor etc., according to the desired data or the tag can be automatically selected based on the tag attached to the second dynamic image.

The range to be selected and extracted can be all of the dynamic images D determined to be related or the range can be limited such as the image obtained within the recent two years, for example. According to the present embodiment, the newly obtained (that is, recent) dynamic image D is to be the second dynamic image, and the related dynamic image D is selected from the past image. However, the second dynamic image D is not limited to the new dynamic image, and for example, when there is the dynamic image D imaged right after a certain operation, this may be set as the second dynamic image, and the dynamic image from the past dynamic image D to the recent dynamic image D (that is, before and after the second dynamic image) related to the above dynamic image D can be selected as the related dynamic image.

The controller 31 as the data selector analyzes the change over time in the plurality of frame images d1 to dn (change over time in one occasion of imaging) included in the dynamic image D (second dynamic image and first dynamic image (related dynamic image)) and obtains the data which can be compared and evaluated (step S22).

Figure 5A:
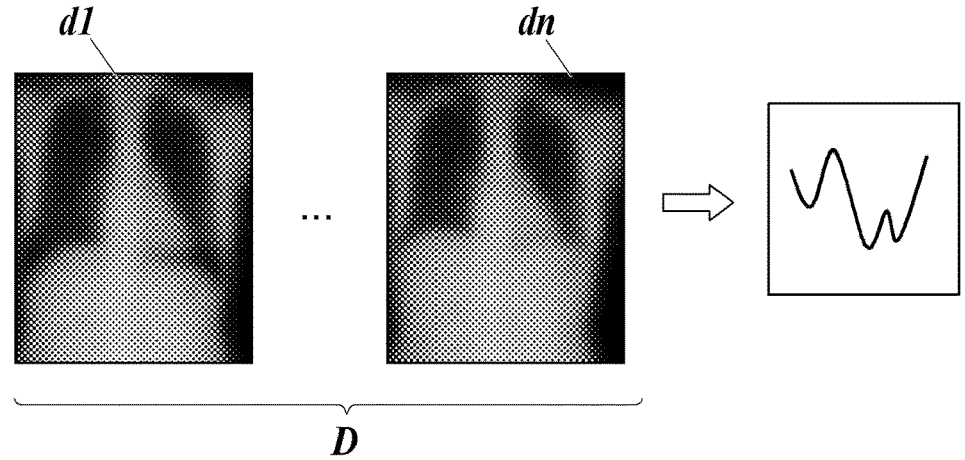
FIG. 5A is an explanatory diagram schematically showing change over time in one occasion of imaging.
Figure 5B:
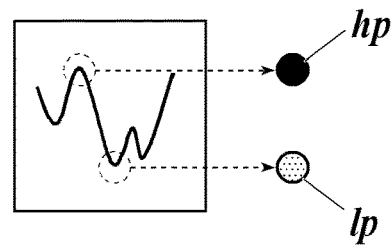
FIG. 5B is an explanatory diagram showing an example of a feature amount of a change over time in one occasion of imaging.

For example, FIG. 5A is a diagram describing an example obtaining the vertical movement in the diaphragm (change over time) occurring by the breathing in one occasion of imaging when the dynamic imaging is performed while breathing.

As shown in FIG. 5A, when the vertical movement of the diaphragm in the frame images d1 to dn included in the dynamic image D is analyzed and shown as a graph, the graph may be used so as to be able to compare and evaluate the change over time in one occasion of imaging as shown in the edge on the right of FIG. 5A.

Regarding the data which can be compared and evaluated, the type of data that can be analyzed and extracted from the dynamic image D is different depending on the algorithm applied to the dynamic image D. According to the present embodiment, as described above, by performing the imaging by matching the imaging conditions, etc., the new algorithm is applied to the past image, and the data of the feature amount which can be extracted can be updated.

Figure 6:
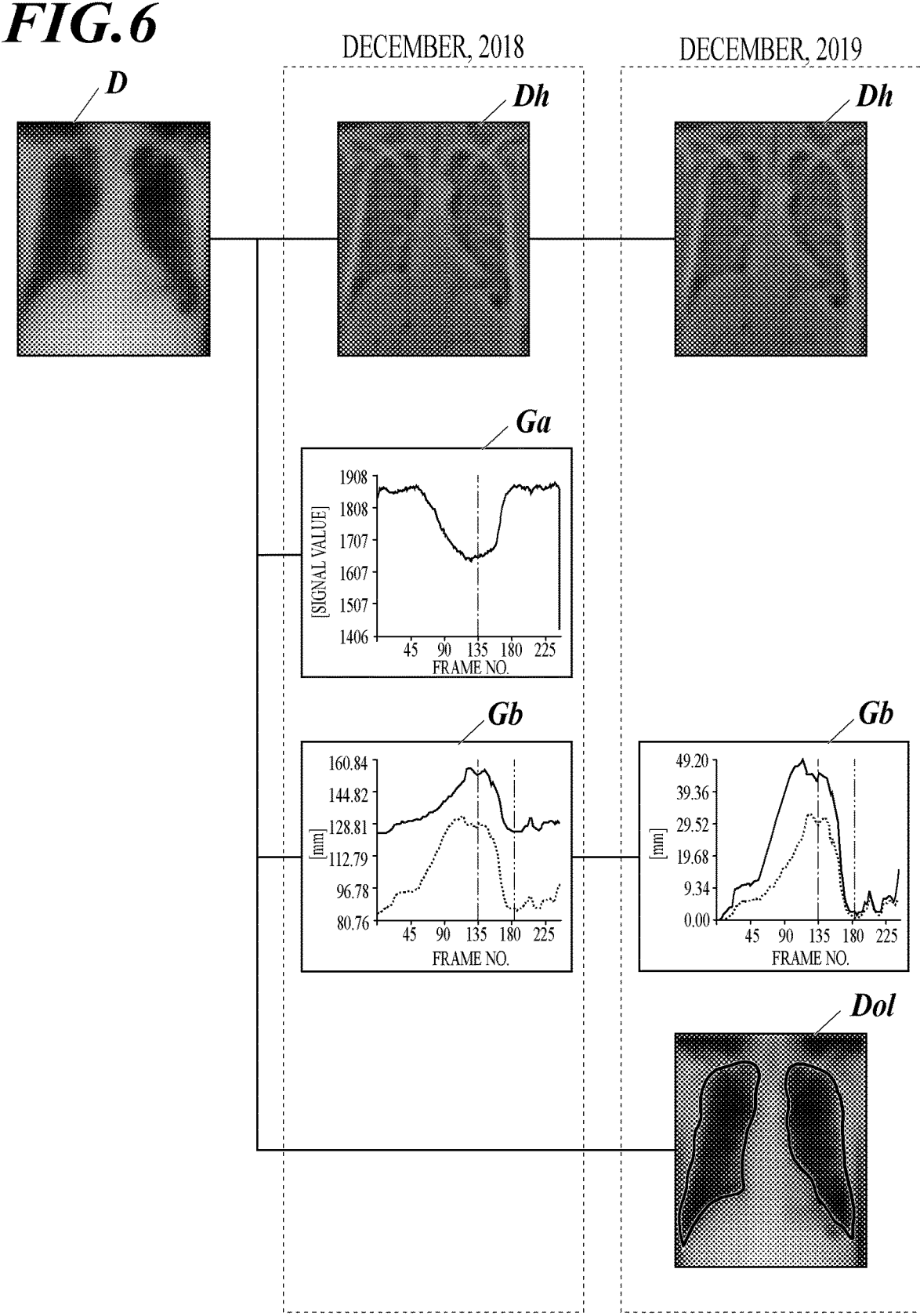
FIG. 6 is an explanatory diagram showing an example of a feature amount extracted from images imaged in a plurality of points in time.

FIG. 6 is a diagram showing the data that can be compared and evaluated and describes the difference in the data that can be analyzed and extracted depending on the algorithm applied to the dynamic image.

The example shown in FIG. 6 shows that according to the algorithm applied in December of the year 2018, highlighted image Dh, data of the image signal value (signal value graph Ga) and data following the position (height position) in the left and right of the diaphragm (diaphragm following graph Gb) can be analyzed and extracted from the dynamic image D. On the other hand, when the algorithm in December of the year 2019 is applied to the dynamic image D, the highlighted image Dh, the data following the position (height position) in the left and right of the diaphragm (diaphragm following graph Gb) and lung field edge detection data Do1 can be analyzed and extracted.

Therefore, regarding the dynamic image D obtained and stored before applying the algorithm in December of the year 2019, by applying the algorithm in December of the year 2019 which is different from the algorithm applied at the time the image is obtained, it is possible to extract from the dynamic image D obtained in the past the lung field edge detection data Do1 which could not be obtained at the time the image was obtained.

With this, even if the image selected as the related dynamic image is analyzed under the old algorithm, and there is no data which can be compared and evaluated common with the new dynamic image (second dynamic image), the common data which can be compared and evaluated can be obtained by applying the algorithm the same as the new dynamic image to the related dynamic image.

According to the present embodiment, the data is updated by the new algorithm, and with this, the data of the past dynamic image D can be effectively used.

When the change over time in one occasion of imaging in the dynamic images D is analyzed, the controller 31 as the feature change amount calculator extracts the feature amount which can be compared and evaluated among the dynamic images D from the plurality of frame images d1 to dn included in the dynamic image D (second dynamic image and first dynamic image (related dynamic image)). Then, the various dynamic images D are summarized (step S23).

According to the present embodiment, the various data regarding the change over time in the dynamic image D can be summarized in various situations such as gathering, storing, and displaying the data.

Figure 7:
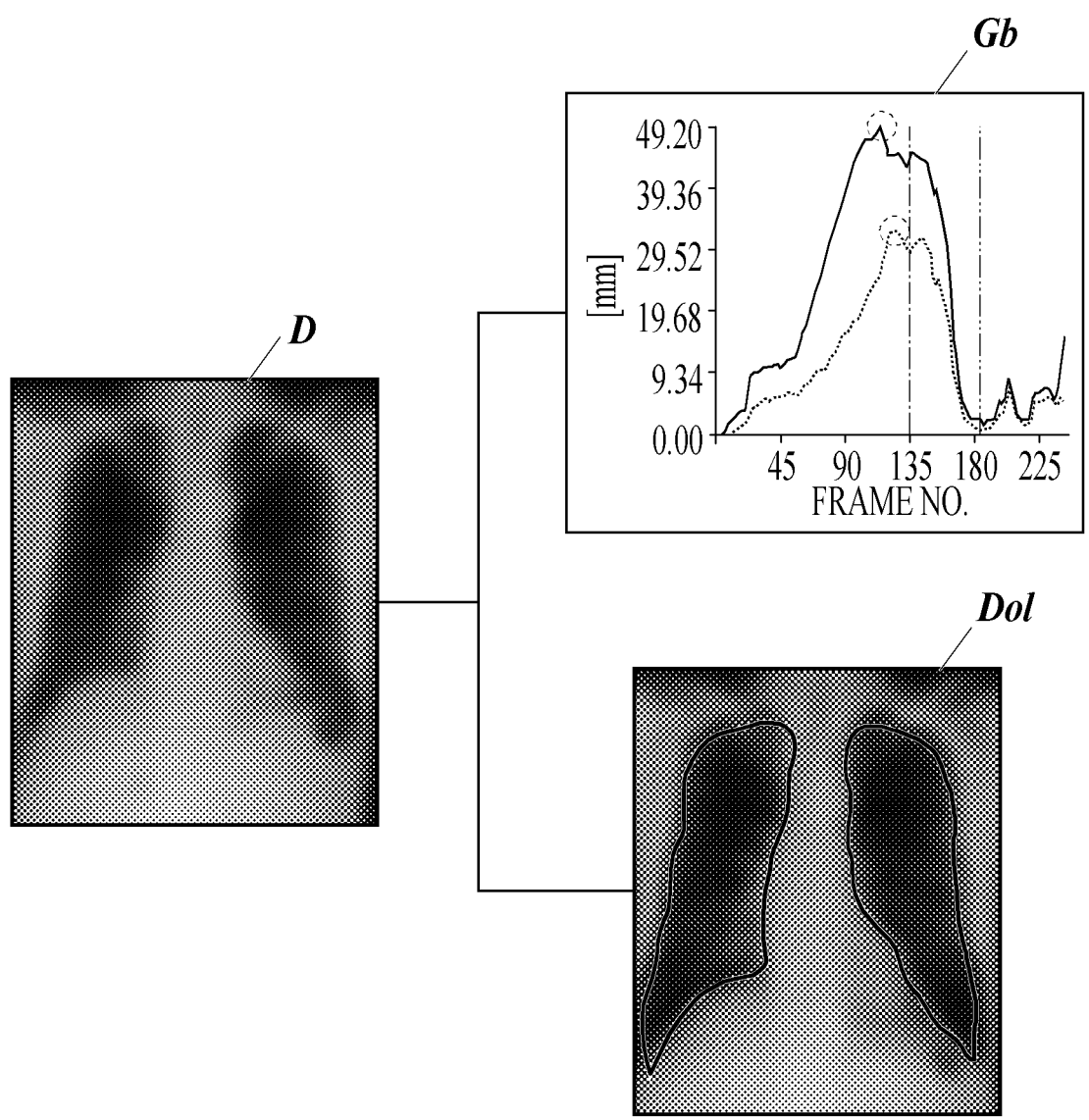
FIG. 7 is an explanatory diagram showing an original image and an example of a feature amount extracted from an original image.

For example, as shown in FIG. 7, when the diaphragm following graph Gb and the lung field edge detection data Do1 can be analyzed and extracted from a certain dynamic image D, a maximum movement amount (maximum movement point is shown by a broken line circle in the diagram) of the left and right of the diaphragm is taken out, and with this, the data regarding the dynamic image D including a plurality of frame images d1 to dn can be collected to one value.

That is, as shown in FIG. 8, the numeric values that change over time and that are scattered among the plurality of frame images d1 to do can be collected to a single numeric value which is the maximum movement amount of 32 mm in the right of the diaphragm and the maximum movement amount of 49 mm in the left of the diaphragm.

Similarly, in the lung field edge detection data Do1, the maximum/minimum area is taken out for the detected coordinates of the lung field edge, and with this, the data regarding the dynamic image D including a plurality of frame images d1 to dn can be collected to one value. Since the area of the lung field changes over time, it is possible to quantify the change in the maximum/minimum area and to observe the change.

For example, from the change over time in the vertical movement of the diaphragm in one occasion of imaging as shown in FIG. 5A, various feature amounts can be extracted depending on where the focus is placed on. For example, there is a method to obtain the average value of the amplitude from the start (left edge) of the graph to the end (right edge). According to the example shown in FIG. 5B, the value when the diaphragm is in the highest position (highest position hp) and the value when the diaphragm is in the lowest position (lowest position lp) are extracted as the feature amount. By extracting the highest position hp and the lowest position lp in one occasion of imaging, the dynamic image D including a plurality of frame images d1 to dn is summarized to one value with which comparison and evaluation with other dynamic images D can be performed.

If the entire change over time in the dynamic image D in one occasion of imaging is extracted as data and this is used as is to compare the dynamic images D, the target of comparison is not clear and it is not possible to compare and evaluate the dynamic images D correctly.

Here, by limiting the points to be focused and summarizing the dynamic image D, the comparison and evaluation can be performed with meaning.

That is, when the dynamic images D (second dynamic image and first dynamic image (related dynamic image)) are summarized to one value, the controller 31 as the feature change amount calculator is able to calculate the change amount of each value easily (step S24).

The controller 31 as the feature change amount calculator calculates the change amount of each value based on the change in the time direction of one or more frame images d1 to dn.

The controller 31 can calculate the change amount from one or more frame images d1 to dn included in the dynamic image D and it is not necessarily limited to summarizing the data included in the dynamic image D.

Figure 5C:
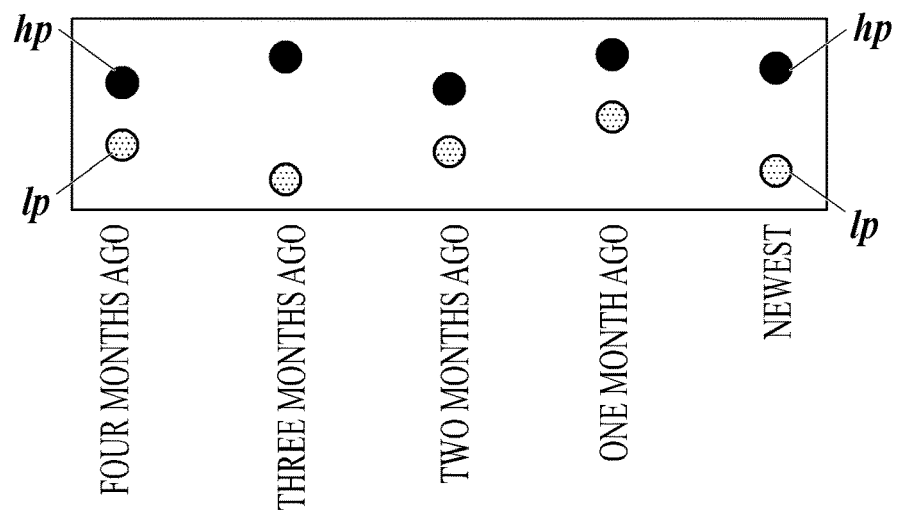
FIG. 5C is an explanatory diagram schematically showing change over time in an image imaged at different points in time.

For example, the example shown in FIG. 5C shows a plurality of dynamic images D imaged in different points in time (in FIG. 5C, in order from right to left, the recent data, one month before, two months before, three months before, four months before) shown on one graph so as to be able to compare and evaluate among the plurality of imaged dynamic images D.

Similarly, based on the detected coordinates of the lung field edge, as shown in FIG. 9, maximum/minimum area of the right lung field, maximum/minimum area of the left lung field, maximum/minimum area when the left and right lung fields are added, the area change rate of the right lung field, the area change rate of the left lung field, and the area change rate of the left and right lung fields can be obtained as feature amounts from the lung field edge detection data Do1.

Figure 10:
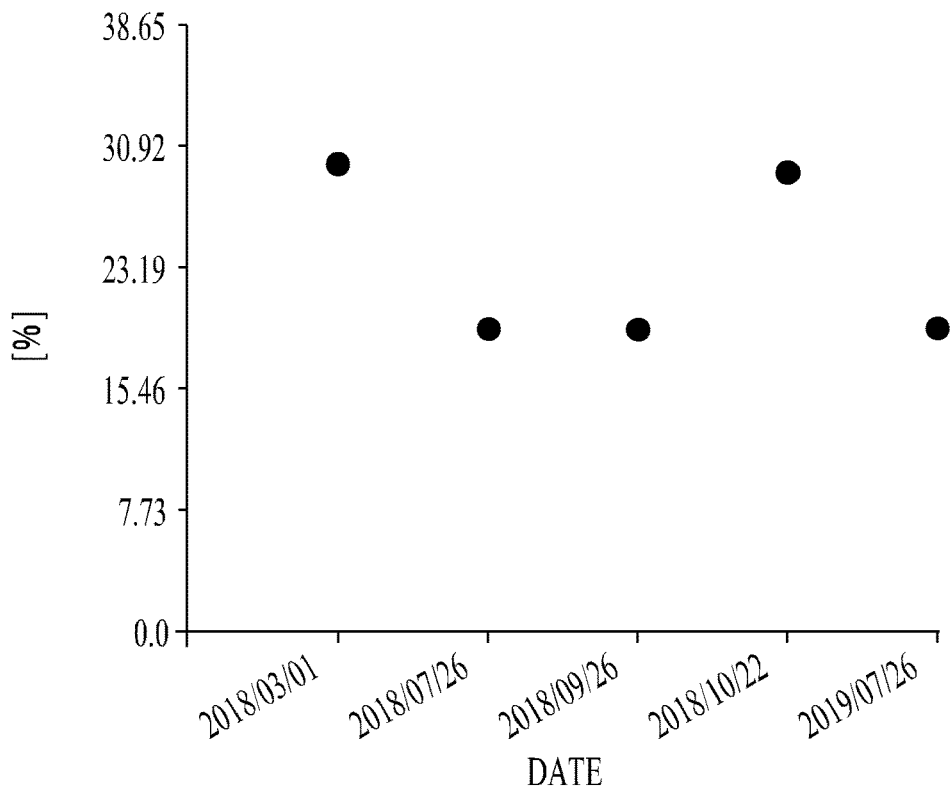
FIG. 10 is an example of a graph showing in a time series a rate in a change of a lung field area extracted from an image imaged in a plurality of points in time.
Figure 11:
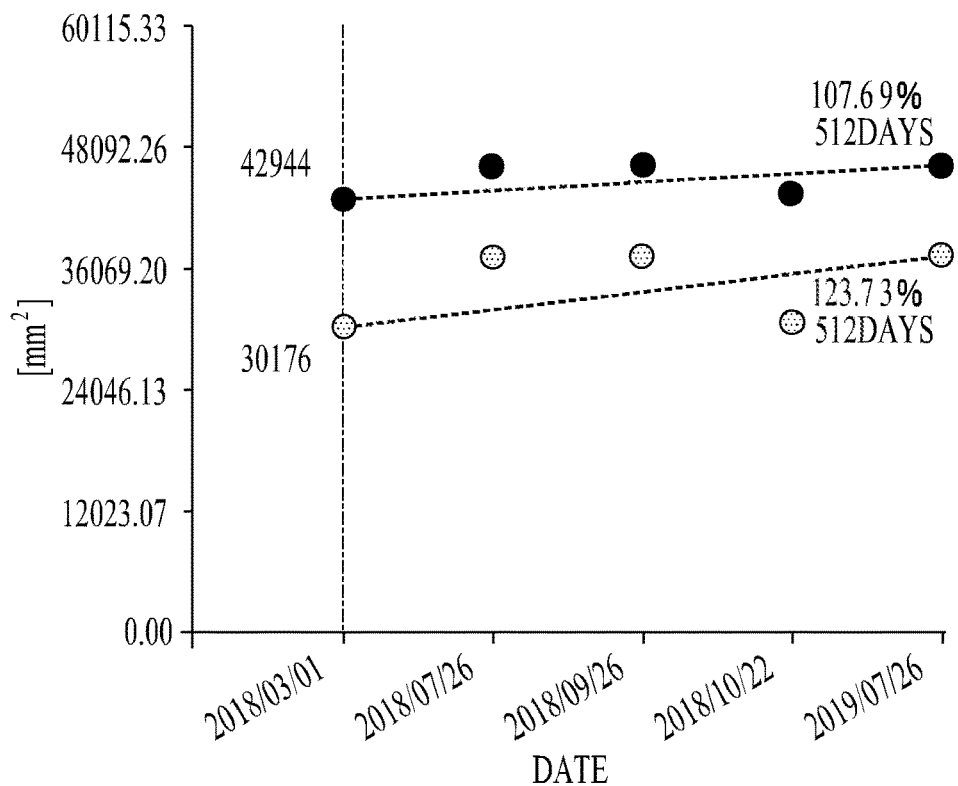
FIG. 11 is an example of a graph showing in a time series change in a maximum/minimum lung field area extracted from an image imaged in a plurality of points.

The change over time of these values extracted from the lung field edge detection data Do1 is compared and evaluated among the dynamic images D and with this, the graph as shown in FIG. 10 and FIG. 11 can be obtained.

Among the above, FIG. 10 is a graph showing the change of the change rate of the lung field area over time in the dynamic images D, and the data becomes newer from left to right of the graph. In FIG. 10, the transition of the change rate in the lung field area of about 16 months from Mar. 1, 2018 to Jul. 26, 2019 can be observed.

FIG. 11 is a graph showing a change over time in the maximum/minimum value of the lung field area among the dynamic images D, and the data becomes newer from left to right of the graph. In FIG. 11, the transition of the maximum/minimum value of the lung field area of about 16 months from Mar. 1, 2018 to Jul. 26, 2019 can be observed.

The controller 31 functions as the display controller and controls the display of the display 34 to display the change over time in one occasion of imaging on the display 34 (step S25).

Specifically, the frame images d1 to dn included in one occasion of imaging in the dynamic image D and various data showing the change over time in one occasion of imaging obtained by analyzing the dynamic image D such as, graph shown in FIG. 5A, emphasized image Dh, signal value graph Ga, diaphragm following graph gb, and lung field edge detection data Do1 shown in FIG. 6, and various tables shown in FIG. 8 and FIG. 9 listing the values are displayed on the display 34.

Further, the controller 31 functions as the display controller and controls the display shown on the display 34 so that the change over time among the plurality of dynamic images D imaged at different points in time (that is, between the second dynamic image and the related dynamic image selected by the controller 31 as the data selector) is displayed on the display 34 (step S26).

Specifically, as shown in the graph shown in FIG. 5C, FIG. 10, and FIG. 11, the values summarizing the dynamic images D (second dynamic image and first dynamic image (related dynamic image)) are displayed on the display 34 in a state so that the values can be compared and evaluated. The second dynamic image itself and the image of the related dynamic image itself can be displayed.

Since the analysis result displayed on the display 34 is used in medical evaluation, it is necessary to perform display so that the doctor viewing the display from a medical point of view does not feel strange.

For example, in the surroundings of the diaphragm, usually the heart which is a large portion is positioned on the left side. Therefore, the right side is always low and the left side is always high, and a difference between the left and the right always occurs as a positive value on the image. However, from the functional point of view regarding how much the left and right of the diaphragm moves vertically, preferably, as shown in the diaphragm following graph Gb shown in FIG. 7, the left and right lowest values are matched and how much the diaphragm rises functionally is shown.

According to the present embodiment, the controller 31 as the display controller matches the base point in the functional change of the target site (that is, matches the lowest value in the left and right of the diaphragm to zero when the vertical movement of the diaphragm is viewed), and the controller 31 displays the change of the feature amount on the display 34.

For example, in the graph as described in FIG. 10 and FIG. 11, when a certain point is clicked, the data at this point in time can be displayed with the past data and the newest data so that it is possible to compare the data.

As described above, the change over time in the dynamic image D in one occasion of imaging and the change over time in the plurality of dynamic images D imaged at different points in time are displayed on the display 34 so that it is possible to provide to the doctor material useful for diagnosis.

As described above, the diagnostic console 3 which is the dynamic image analysis apparatus of the present embodiment includes the controller 31 and the display 34. The controller 31 performs tagging on the dynamic image D. Moreover, the controller 31 extracts the feature amount from the plurality of frame images d1 to dn included in the dynamic image D, calculates the change amount in the time direction of the feature amount, and when the second dynamic image D obtained by a different occasion of imaging and including the same target site as the first dynamic image is input, selects the feature amount which can be extracted from the related dynamic image which is the first dynamic image D determined to be related to the second dynamic image D from the tag, the first dynamic image D, and the second dynamic image D. The display 34 is capable of displaying the change over time in the frame images d1 to dn included in one occasion of imaging the dynamic image D. The display 34 is capable of displaying the change over time between the second dynamic image D and the selected related dynamic image and the change over time between the feature amount extracted from the second dynamic image D and the feature amount extracted from the related dynamic image.

With this, the dynamic image D in which the change over time in one occasion of imaging can be captured is used so as to be able to capture the change over time among the dynamic images D.

Therefore, for example, the change over time of the target site which is obtained in one occasion of imaging and which is within a very short amount of time such as one cycle of breathing (for example, change in the movement of the diaphragm, change in the expanding and reducing of the lung field area), and the change over time obtained by quantifying the change over time in one occasion of imaging and comparing the dynamic images D obtained in the imaging at a plurality of points in time can be provided as information for diagnosis, and diagnosis can be performed by a combination of the above.

For example, in order to perform comparison of an active state of the lungs, etc., it is necessary to consider the comparison and to understand the state in a relatively long span such as before and after surgery or the process from the start of treatment up to the present. It is also important to suitably understand the state of movement at a certain point in time such as what kind of movement occurred at which point in time. According to the dynamic image analysis apparatus of the present embodiment, the patient can be observed by the combination of the above, and excellent clinical value can be achieved.

According to the present embodiment, the controller 31 as the tag setter performs tagging to the dynamic image D regarding at least one of the following items including positioning in imaging, type and method of movement of target site and change in tissue, and imaging condition in imaging.

Therefore, the image can be classified from various viewpoints, and the suitable related dynamic image can be selected.

According to the present embodiment, the controller 31 as the tag setter performs the tagging of one item or a combination of a plurality of items regarding the items to help the classifying of the dynamic image D.

As described above, not only a single tag but a combination of a plurality of tags may be used, and a more suitable related dynamic image can be selected.

According to the present embodiment, the controller 31 as the feature change amount calculator calculates the change amount from one or more frame images d1 to dn.

Therefore, the change amount can be calculated from the suitably quantified dynamic image D.

According to the present embodiment, the controller 31 as the feature change amount calculator calculates the change amount based on the change in the time direction of one or more frame images.

With this, the change over time in the dynamic image D can be suitably captured.

According to the present embodiment, the controller 31 as the feature change amount calculator applies an algorithm different from when the image is obtained for the dynamic image D obtained in the past and extracts the feature amount. The controller 31 is capable of calculating the change amount in the time direction of the above feature amount.

With this, when there is an algorithm which is newly found and applied, and there is new data that could not be extracted when the past image was obtained but can be obtained using the above algorithm, the algorithm can be applied to the dynamic image D obtained in the past and the data can be updated.

Consequently, the dynamic image D obtained in the past can also be used effectively.

According to the present embodiment, the controller 31 as the display controller controls the display 34 to display the change over time in the frame images d1 to dn included in one occasion of imaging of the dynamic image D. The controller 31 controls the display 34 to also display in a state to be able to compare and evaluate the change over time between the second dynamic image D and the related dynamic image selected by the controller 31 as the data selector, and the change over time between the feature amount extracted from the second dynamic image D and the feature amount extracted from the related dynamic image.

With this, both the change over time of the target site obtained within a very short time in one occasion of imaging and the change over time when the dynamic images D obtained in imaging performed at different points in time are compared can be provided as information to support diagnosis.

According to the present embodiment, the controller 31 as the display controller controls the display 31 to display the change of the feature amount with a base point in the functional change of the target site matched.

Therefore, when a difference inevitably occurs from a medical viewpoint if the absolute value is observed, it is possible to perform the display which is easy to understand without a strange feeling.

The embodiments of the present invention are described above, but the present invention is not limited to the above embodiments, and various modifications are possible without leaving the scope of the invention.

For example, according to the present embodiment, the diagnostic console 3 in the medical image system 100 functions as the dynamic image analysis apparatus, but the dynamic image analysis apparatus is not limited to the above. For example, other than the medical image system 100, an individual dynamic image analysis work station may be provided and the dynamic image D may be obtained from the medical image system 100 through various networks.

For example, the dynamic image D on which the analysis process is performed in the dynamic image analysis apparatus may be provided from an external apparatus through various networks instead of obtaining the dynamic image D within the medical image system 100.

According to the above configuration, when one patient consults a plurality of medical facilities, the dynamic image D imaged in a different medical facility where the patient consulted in the past can be effectively used.

In this case, preferably, in order to be able to suitably compare the change over time, the dynamic image D is imaged under the same rules such as the same imaging protocols and the conditions at the time of imaging are reliably the same.

For example, when the change over time is displayed as a graph on the display 34, the display may be discriminated depending on the state of change or tendency of change. For example, the data showing the normal value may be displayed with the color changed from the data showing the abnormal value.

With this, it is possible to show whether the symptoms are becoming better or not in a manner that is visibly easy to understand.

Other than the above, the detailed configuration and the detailed operation in the dynamic image analysis apparatus (diagnostic console 3 according to the present embodiment) can be suitably changed without leaving the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A dynamic image analysis apparatus comprising:
   a hardware processor; and
   a display,
   wherein:
   the hardware processor performs tagging regarding an item that helps classifying of a dynamic image for each of a plurality of dynamic images, each of the dynamic images being obtained by radiation imaging of a subject including a target site in a live body, each of the dynamic images including a plurality of frame images from one occasion of imaging, and the plurality of dynamic images being from different occasions of imaging, when a second dynamic image is input, the hardware processor selects a first dynamic image which is determined to be related with the second dynamic image based at least on a tag set for the first dynamic image and a tag set for the second dynamic image, the second dynamic image being obtained on a different occasion of imaging and including a same target site as the first dynamic image, the hardware processor extracts feature amounts from the first dynamic image and the second dynamic image, and the hardware processor controls the display to display a change over time between the feature amount extracted from the second dynamic image and the feature amount extracted from the first dynamic image, in a state that enables comparing and evaluating the change over time between the feature amount extracted from the second dynamic image and the feature amount extracted from the selected first dynamic image which is which is determined to be related with the second dynamic image.

2. The dynamic image analysis apparatus according to claim 1, wherein the hardware processor performs the tagging on the dynamic images regarding at least one of the following items including positioning in imaging, type and method of movement of the target site and change in tissue, and imaging condition in imaging.

3. The dynamic image analysis apparatus according to claim 1, wherein, for each one of the dynamic images, the hardware processor performs the tagging with one item or a combination of a plurality of items to help classifying of the dynamic image.

4. The dynamic image analysis apparatus according to claim 1, wherein, for each one of the dynamic images, the hardware processor calculates, from the frame images, feature amounts that summarize a change over time of the target site in the one dynamic image.

5. The dynamic image analysis apparatus according to claim 1, wherein the hardware processor is capable of applying on a dynamic image obtained in the past an algorithm that is different from an algorithm applied when the dynamic image was obtained, to extract the feature amount from the dynamic image obtained in the past.

6. The dynamic image analysis apparatus according to claim 1, wherein the hardware processor controls the display to display a change over time in the frame images included in one of the dynamic images.

7. The dynamic image analysis apparatus according to claim 1, wherein the hardware processor controls the display to display a change in the feature amount aligning a base point in a functional change of the target site.

8. The dynamic image analysis apparatus according to claim 1, wherein the hardware processor controls the display to display a state for comparing and evaluating the change over time between the second dynamic image and the first dynamic image.

9. A dynamic image analysis method comprising:

tagging regarding an item that helps classifying of a dynamic image for each of a plurality of dynamic images, each of the dynamic images being obtained by radiation imaging of a subject including a target site in a live body, each of the dynamic images including a plurality of frame images from one occasion of imaging, and the plurality of dynamic images being from different occasions of imaging, receiving input of a second dynamic image and selecting a first dynamic image which is determined to be related with the second dynamic image based at least on a tag set for the first dynamic image and a tag set for the second dynamic image, the second dynamic image being obtained on a different occasion of imaging and including a same target site as the first dynamic image, extracting feature amounts from the first dynamic image and the second dynamic image, and displaying, on a display, a change over time between the feature amount extracted from the second dynamic image and the feature amount extracted from the first dynamic image, in a state that enables comparing and evaluating the change over time between the feature amount extracted from the second dynamic image and the feature amount extracted from the selected first dynamic image which is which is determined to be related with the second dynamic image.

10. The dynamic image analysis method according to claim 9, further comprising displaying, on the display, a change over time in the frame images included in one of the dynamic images.

11. The dynamic image analysis method according to claim 9, further comprising displaying, on the display, a state for comparing and evaluating the change over time between the second dynamic image and the first dynamic image.

12. A non-transitory computer-readable storage medium storing a program causing a computer to perform operations comprising:

tagging regarding an item that helps classifying of a dynamic image for each of a plurality of dynamic images, each of the dynamic images being obtained by radiation imaging of a subject including a target site in a live body, each of the dynamic images including a plurality of frame images from one occasion of imaging, and the plurality of dynamic images being from different occasions of imaging, when a second dynamic image is input, selecting a first dynamic image which is determined to be related with the second dynamic image based at least on a tag set for the first dynamic image and a tag set for the second dynamic image, the second dynamic image being obtained on a different occasion of imaging and including a same target site as the first dynamic image, extracting feature amounts from the first dynamic image and the second dynamic image, and displaying, on a display, a change over time between the feature amount extracted from the second dynamic image and the feature amount extracted from the first dynamic image, in a state that enables comparing and evaluating the change over time between the feature amount extracted from the second dynamic image and the feature amount extracted from the selected first dynamic image which is which is determined to be related with the second dynamic image.

13. The non-transitory computer-readable storage medium according to claim 12, the operations further comprising displaying, on the display, a change over time in the frame images included in one of the dynamic images.

14. The non-transitory computer-readable storage medium according to claim 12, the operations further comprising displaying, on the display, a state for comparing and evaluating the change over time between the second dynamic image and the first dynamic image.

15. A dynamic image analysis apparatus comprising:
a hardware processor; and
a display,
wherein:
the hardware processor performs tagging regarding an item that helps classifying of a dynamic image for each of a plurality of dynamic images, each of the dynamic images being obtained by radiation imaging of a subject including a target site in a live body, each of the dynamic images including a plurality of frame images from one occasion of imaging, and the plurality of dynamic images being from different occasions of imaging, when a second dynamic image is input, the hardware processor selects a first dynamic image which is determined to be related with the second dynamic image based at least on a tag set for the first dynamic image and a tag set for the second dynamic image, the second dynamic image being obtained on a different occasion of imaging and including a same target site as the first dynamic image, the hardware processor extracts feature amounts from the first dynamic image and the second dynamic image, the display is capable of displaying a change over time in the frame images included in one occasion of imaging of the dynamic image, the display is capable of displaying a change over time between the second dynamic image and the first dynamic image, and the display is capable of displaying a change over time between the feature amount extracted from the second dynamic image and the feature amount extracted from the first dynamic image, and the hardware processor is capable of applying on a dynamic image obtained in the past an algorithm that is different from an algorithm applied when the dynamic image was obtained, to extract the feature amount from the dynamic image obtained in the past and calculate a change amount in a time direction of the feature amount.

* * * * *